Patented Apr. 23, 1929.

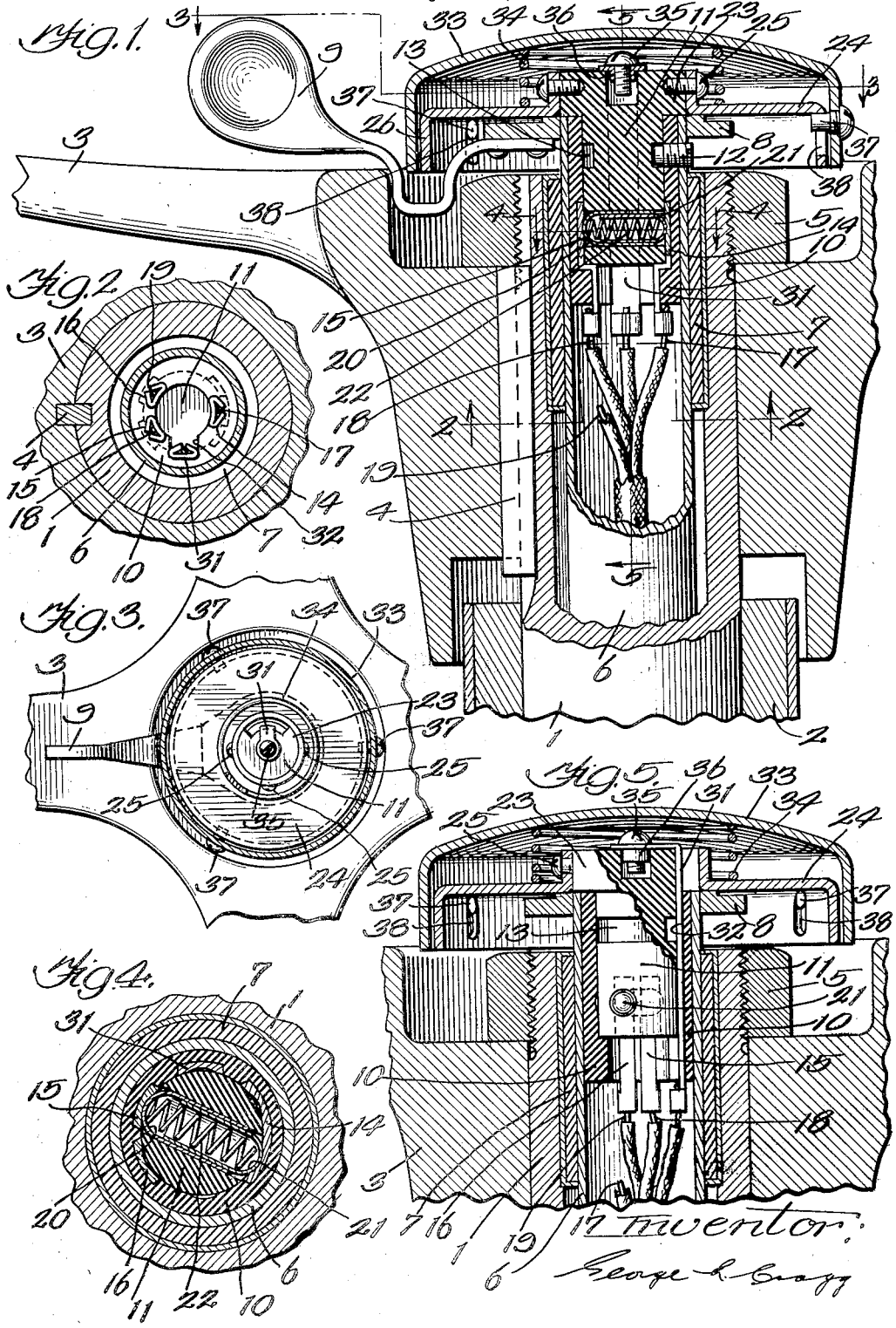

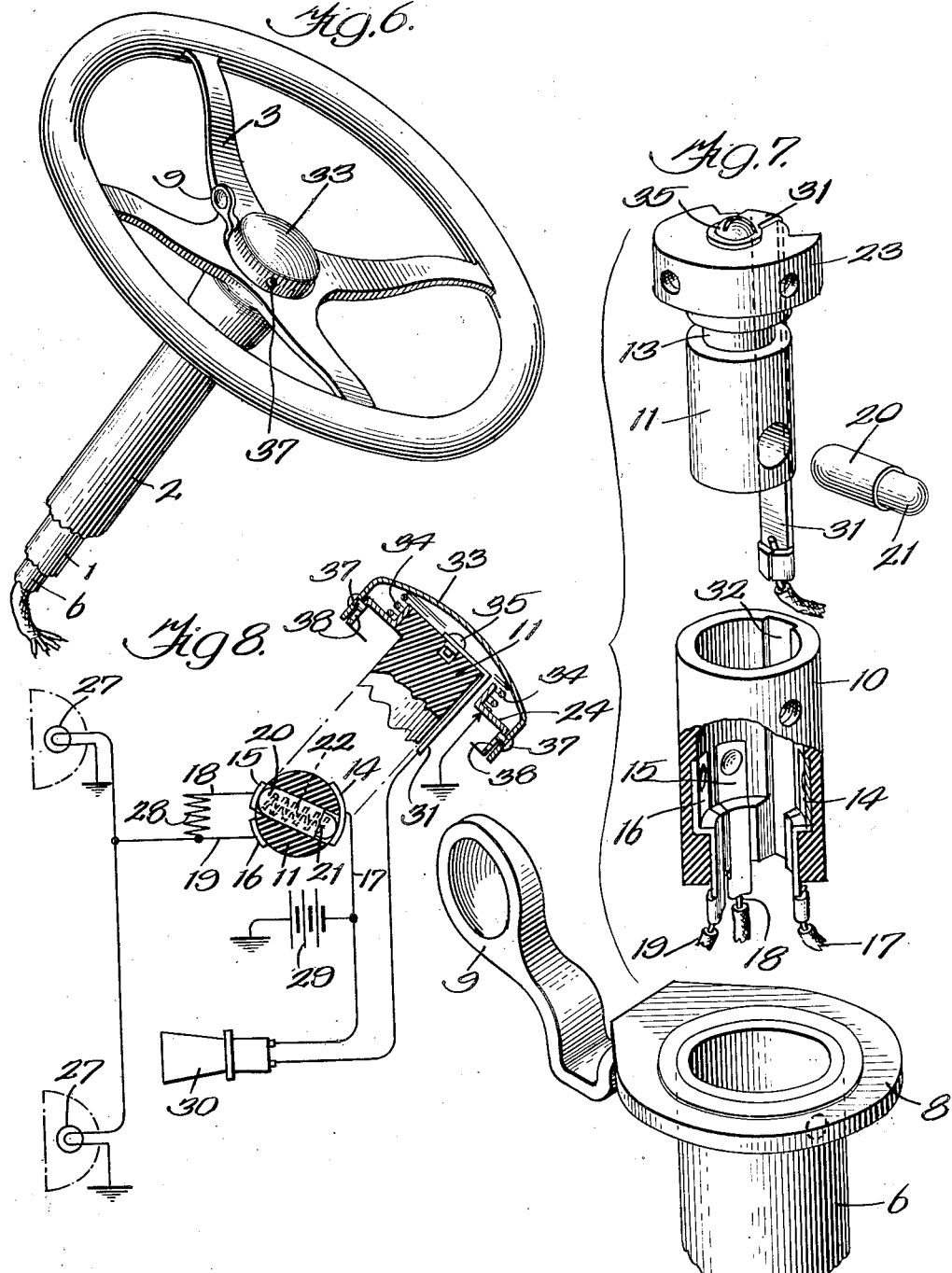

1,710,407

UNITED STATES PATENT OFFICE.

GEORGE L. CRAGG, OF CHICAGO, ILLINOIS, ASSIGNOR TO HARRY A. DOUGLAS, OF BRONSON, MICHIGAN.

COMBINED LIGHTING AND SIGNALING MECHANISM FOR AUTOMOTIVE VEHICLES.

Application filed April 16, 1927. Serial No. 184,344.

My invention relates to automotive vehicles and resides in means whereby the push button which controls a signaling circuit and which is commonly known as a horn button may also be employed as the operating element of a switch which enters into the control of a lighting circuit of the vehicle.

Such a button, as is well known, is disposed at the front side of a hand wheel which is coupled with the steering shaft. The button is so arranged that it may be manually moved against the force of a restoring spring toward the steering shaft and along the wheel axis to close the signaling circuit, the movement of the button being reversed, by the spring, when it is released to open the signaling circuit. In accordance with my invention, the button is arranged to control the lighting circuit by being turned, the employment of an additional hand lever or handle whose sole function would be to control the lighting circuit being thereby dispensed with. The arrangement is such that the movements of the button along the wheel axis in controlling the signaling circuit do not affect the lighting circuit and the rotary movement of the button in controlling the lighting circuit does not affect the signaling circuit. The lighting switch is desirably disposed within the steering shaft, that is hollow, and preferably has three positions, one, an open circuit position, another, a bright head light position, and the third, a dim head light position. These three adjustments may readily be effected without affecting the signaling circuit, as stated, and if the bright head light adjustment is normally established for a given run of the automotive vehicle, it may be quickly replaced by the dim head light adjustment on the approach of another vehicle.

My invention will be more particularly explained by reference to the accompanying drawings in which Fig. 1 is a longitudinal sectional view through the hub portion of the hand operated steering wheel, the adjacent end portions of the hollow steering shaft and steering column, and the lighting circuit and signaling circuit switching devices; Fig. 2 is a sectional view on line 2—2 of Fig. 1; Fig. 3 is a sectional view on line 3—3 of Fig. 1, on a smaller scale; Fig. 4 is a sectional view on line 4—4 of Fig. 1, on a larger scale; Fig. 5 is a sectional view on line 5—5 of Fig. 1; Fig. 6 is a perspective view illustrating the double functioning push button upon the front side of the hand steering wheel; Fig. 7 is a perspective view of various parts of the novel mechanism in separated relation; and Fig. 8 is a diagrammatic illustration of the preferred circuit arrangement.

The steering shaft 1 is shown as being hollow. It is connected at its lower end with the steering gear of an automotive vehicle such as the steering vehicle wheels of an automobile, as is well understood. The steering shaft is mounted to turn within a stationary steering column 2 which is suitably anchored in position. A hand steering wheel 3 is coupled in fixed relation with the shaft by means of a key or feather 4, this hand steering wheel being above the steering column, the steering shaft extending upwardly beyond the steering column in order that it may be coupled with the wheel, as is understood. The upper end of the steering shaft is threaded to receive an assembling nut 5 for holding the wheel in a fixed zone with respect to the steering shaft, the hub portion of the wheel being dished out to receive said nut. In the embodiment of the invention illustrated, a hollow rod 6 passes through the bore of the steering shaft and is connected at its lower end with the air valve that governs the admission of air to the carburetor. This rod is journaled, at its upper end, in a bearing 7 which is received in the upper end of the steering shaft 1. A collar 8 is secured to the upper end of the rod 6 and a hand lever 9 is attached to the collar whereby said rod may be turned to adjust the amount of air that is to be carbureted.

An insulating sleeve 10 is fixed in the upper end of the rod 6 and serves as a casing for light controlling switch. A plug 11 of insulation is mounted to turn in the sleeve 10 and is confined to a fixed zone of rotation by a screw 12 whose inner end is received within an annular groove 13 formed in said plug. A switch is contained within the hollow rod 6 and within the interior of the shaft 1 near the upper ends of these elements. This switch is inclusive of three arcuate contacts 14, 15 and 16 which are mounted upon and within the insulating sleeve 10 and which extend downwardly beyond this sleeve for connection with the circuit wires 17, 18 and 19 which are connected in the circuit that is illustrated in Fig. 8 and which circuit will be later more fully described.

The plug 11 carries two metallic contacts 20 and 21 which are in telescoping relation and which enclose a coiled spring 22 which presses the outer ends of these contacts apart and into engagement either with the contacts 14, 15 and 16, respectively, or out of such engagement, according to the position to which the plug 11 is turned. The upper end of the contact carrying and actuating plug 11 is desirably formed with a flange 23 which overhangs the sleeve 10 and the hollow rod 6. A collar 24 surrounds the flange 23 and is assembled therewith by means of screws 25. This collar has a skirt 26 which extends toward the wheel 3, the collar and the parts in the same zone therewith being at the front side of said wheel. The collar is coaxial with the steering rod 6, the shaft 1, the sleeve 10 and the contact actuating plug 11 and is turned upon its axis in order to place the lighting circuit in its various adjustments. This lighting circuit is inclusive of two head lamps 27, each head lamp being connected by the conductor 19 with the contact 16 and by the conductor 18 with the contact 15, the conductor 18 including the dimming resistance 28 in series therewith. When the lighting circuit is adjusted as illustrated in Fig. 8, the head lamps glow dimly, owing to the resistance 28. When the plug 11 is turned to connect the contact 20 with the contact 16, the dimming resistance is excluded from circuit, when the head lamps glow brightly. The contact 14 is engaged by the contact 21 when the contact 20 is in engagement with either of the contacts 15 or 16. When the contacts 20 and 21 are turned out of engagement with contacts complemental thereto, the circuit is opened. It is understood that the lighting circuit is completed by way of the conductor 17 which is grounded through the battery 29. The signaling circuit includes the sounding horn 30, the grounded battery 29, and the strip conductor 31 which is received in the channel 32 formed in the sleeve 10. This signaling circuit is governed by a hollow cup-shaped push button 33 which is coaxial with the collar 24 and which may be moved along the axis of the wheel and toward the wheel when the signaling circuit is to be established, a coiled spring 34 restoring the button to its non-circuit closing position when the button is released. When the button is manually applied, it engages the contact screw 35 which is in electrical connection with the conductor 31, the button which is metallic being itself grounded. The upper or outer end of the conductor 31 terminates in a bushing 36 which receives the screw 35, this bushing being received in a recess formed in the upper or outer end of the plug 11. The button 33, which is thus at the front side of the steering wheel 3, is reciprocable along the axis of the wheel to govern the signaling circuit. The button is coupled with the collar 24 so that when it is turned, it will turn the collar and thereby turn the plug 11 to control the lighting circuit as desired. The coupling illustrated is of a pin and slot formation, the skirt of the button carrying pins 37 which enter slots 38 formed in the skirt 26 of the collar 24. These slots extend along the axis of the steering wheel so that as the button 33 is moved along the axis of the wheel, it has no affect upon the collar 24 and the light controlling switching mechanism coupled with this collar. When, however, the button 33 is turned, it turns the collar to adjust the lighting circuit as desired.

It has hitherto been the practice to assemble a light controlling switch hand lever with the push button at the front side of the steering wheel. By means of my invention this especially provided light controlling switch hand lever is dispensed with, an important characteristic, especially where other equipment is employed upon the steering wheel.

Changes may be made without departing from the invention.

Having thus described my invention, I claim:

The combination with the hollow steering shaft of an automotive vehicle; of a hand wheel coupled with said shaft for turning it; a push button carried by and on the front side of said wheel and movable along the wheel axis; a circuit controlling switch governed by the push button and having two terminal contacts that are engaged by and upon the depression of said button; a second circuit controlling switch having a terminal contact structure within and stationary with respect to said hollow steering shaft; a switch controlling member having a portion upon the exterior of the steering shaft and adjacent the push button and a portion journaled within the steering shaft to provide an axis of rotation for the switch controlling member that extends along and is within said shaft, said switch controlling member being also inclusive of a contact structure that is rotatable therewith and positioned to be brought into and out of engagement with the aforesaid contact structure according to the position to which said circuit controlling member is turned; and a coupling between said button and switch controlling member which is formed and related to enable the button, when turned, to turn said switch controlling member and permitting movement of the button along the wheel axis without similar movement of said switch controlling member.

In witness whereof, I hereunto subscribe my name.

GEORGE L. CRAGG.